/ United States Patent / Takahashi et al.

(10) Patent No.: US 11,064,377 B2
(45) Date of Patent: Jul. 13, 2021

(54) MOBILE STATION, BASE STATION, METHOD OF REPORTING AN UPLINK DATA AMOUNT, AND METHOD OF ALLOCATING A RESOURCE TO UPLINK DATA (71) Applicant: NTT DOCOMO, INC., Tokyo (JP)

(72) Inventors: Hideaki Takahashi, Tokyo (JP); Tooru Uchino, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/307,944

(22) PCT Filed: Apr. 27, 2015

(86) PCT No.: PCT/JP2015/062718
§ 371 (c)(1),
(2) Date: Oct. 31, 2016

(87) PCT Pub. No.: WO2015/170630
PCT Pub. Date: Nov. 12, 2015

(65) Prior Publication Data
US 2017/0055172 A1 Feb. 23, 2017

(30) Foreign Application Priority Data

May 7, 2014 (JP) .............................. JP2014-096084

(51) Int. Cl.
*H04L 12/26* (2006.01)
*H04W 24/10* (2009.01)
(Continued)

(52) U.S. Cl.
CPC ........... *H04W 24/10* (2013.01); *H04W 24/08* (2013.01); *H04W 72/0486* (2013.01); *H04W 72/1284* (2013.01)

(58) Field of Classification Search
CPC .... H04W 24/00; H04L 43/50; H04L 43/0852; H04L 43/08; H04B 17/003
See application file for complete search history.

(56) References Cited

U.S. PATENT DOCUMENTS 9,264,930 B2 * 2/2016 Damnjanovic ... H04W 72/1252
9,525,536 B1 * 12/2016 Prock .................... H04L 5/0069
(Continued)

FOREIGN PATENT DOCUMENTS

JP 2016536875 A 11/2016
WO 2015062085 A1 5/2015

OTHER PUBLICATIONS

Office Action issued in the counterpart Japanese Patent Application No. 2016-517876, dated Sep. 12, 2017 (6 pages).
Ericsson; "BSR procedures for split bearers"; 3GPP TSG-RAN WG2 #85bis, Tdoc R2-141553; Valencia, Spain, Mar. 31-Apr. 4, 2014 (4 pages).
International Search Report issued in PCT/JP2015/062718, dated Jul. 7, 2015 (1 page).
(Continued)

Primary Examiner — Siren Wei
(74) Attorney, Agent, or Firm — Osha Bergman Watanabe & Burton LLP (57) ABSTRACT A mobile station for performing communication using component carriers which belong to a plurality of base stations includes a reception unit configured to receive configuration information about a scheme of reporting a data amount of uplink data from a base station; a buffer status management unit configured to manage the data amount of uplink data stored in a transmission buffer; a transmission control unit configured to select a base station to which the data amount of uplink data is to be reported according to the configuration information about the scheme of reporting the data amount of uplink data; and a transmission unit configured to report the data amount of uplink data to the selected base station.

3 Claims, 7 Drawing Sheets (51) Int. Cl.
*H04W 72/12* (2009.01)
*H04W 24/08* (2009.01)
*H04W 72/04* (2009.01)

(56) References Cited

U.S. PATENT DOCUMENTS

| | | | | |
|---|---|---|---|---|
| 9,635,655 B2* | 4/2017 | Jha | .................... | H04W 72/0413 |
| 9,661,651 B2* | 5/2017 | Lee | .................... | H04W 72/1284 |
| 9,867,074 B2* | 1/2018 | Virtej | .................... | H04W 24/10 |
| 2008/0153495 A1* | 6/2008 | Ogami | .................... | H04W 36/30 |
| | | | | 455/436 |
| 2012/0077445 A1* | 3/2012 | Konno | .................... | H04L 5/001 |
| | | | | 455/67.11 |
| 2012/0281602 A1* | 11/2012 | Tsunekawa | ........... | H04W 36/30 |
| | | | | 370/280 |
| 2013/0142134 A1* | 6/2013 | Zhu | .................... | H04L 5/001 |
| | | | | 370/329 |
| 2013/0273919 A1* | 10/2013 | Sashihara | ....... | H04W 36/00837 |
| | | | | 455/436 |
| 2014/0056243 A1* | 2/2014 | Pelletier | ................ | H04W 74/04 |
| | | | | 370/329 |
| 2014/0269352 A1* | 9/2014 | Sun | .................... | H04W 72/1284 |
| | | | | 370/250 |
| 2015/0098322 A1* | 4/2015 | Chen | ................ | H04W 28/0252 |
| | | | | 370/230 |
| 2015/0117241 A1* | 4/2015 | Koc | .................... | H04W 36/0055 |
| | | | | 370/252 |
| 2015/0215929 A1* | 7/2015 | Damnjanovic | ....... | H04W 48/16 |
| | | | | 370/241 |
| 2015/0245349 A1* | 8/2015 | Jha | .................... | H04W 28/0205 |
| | | | | 370/329 |
| 2015/0334737 A1* | 11/2015 | Susitaival | ............. | H04W 24/02 |
| | | | | 370/329 |
| 2016/0029245 A1* | 1/2016 | Hong | ................ | H04W 28/0278 |
| | | | | 370/329 |
| 2016/0100397 A1* | 4/2016 | Wen | .................... | H04W 72/1284 |
| | | | | 370/329 |
| 2016/0198491 A1* | 7/2016 | Lee | .................... | H04W 72/1284 |
| | | | | 455/450 |
| 2016/0295442 A1* | 10/2016 | Virtej | ................ | H04W 72/1284 |
| 2017/0111818 A1* | 4/2017 | Sebire | ............... | H04W 28/0278 |

OTHER PUBLICATIONS

Written Opinion of the International Searching Authority issued in PCT/JP2015/062718, dated Jul. 7, 2015 (4 pages).
3GPP TR 36.842 V12.0.0; "3rd Generation Partnership Project; Technical Specification Group Radio Access Network; Study on Small Cell enhancements for E-UTRA and E-UTRAN; Higher layer aspects (Release 12)"; Dec. 2013 (71 pages).
3GPP TS 36.331 V12.1.0; "3rd Generation Partnership Project; Technical Specification Group Radio Access Network; Evolved Universal Terrestrial Radio Access (E-UTRA); Radio Resource Control (RRC); Protocol specification (Release 12)"; Mar. 2014 (57 pages).
3GPP TS 36.300 V12.1.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Mar. 2014 (209 pages).
3GPP TS 36.321 V12.1.0; "3rd Generation Partnership Project; Technical Specification Group Radio Access Network; Evolved Universal Terrestrial Radio Access (E-UTRA); Meduim Access Control (MAC); protocol specification (Release 12)"; Mar. 2014 (356 pages).
3GPP TS 36.323 V11.2.0; "3rd Generation Partnership Project; Technical Specification Group Radio Access Network; Evolved Universal Terrestrial Radio Access (E-UTRA); Packet Data Convergence Protocol(PDCP); specification (Release 11)"; Mar. 2013 (27 pages).
Office Action issued in counterpart Chinese Patent Application No. 201580021861.0, dated Mar. 20, 2019 (10 Pages).
Huawei, HiSilicon; "BSR for small cell enhancement" 3GPP TSG-RAN WG2 Meeting #84, R2-133883; San Francisco, USA, Nov. 11-15, 2013 (5 Pages).
Office Action issued in Chinese Application No. 201580021861.0, dated Aug. 22, 2019 (9 pages).
Office Action issued in Chinese Application No. 201580021861.0; dated Dec. 3, 2019 (10 pages).
Office Action issued in counterpart Chinese Patent Application No. 201580021861.0 dated Jun. 2, 2020 (15 pages).
Decision of Re-examination issued in Chinese Application No. 201580021861.0; dated Sep. 27, 2020 (23 pages).

* cited by examiner

FIG.6

MOBILE STATION, BASE STATION, METHOD OF REPORTING AN UPLINK DATA AMOUNT, AND METHOD OF ALLOCATING A RESOURCE TO UPLINK DATA

TECHNICAL FIELD

The present invention relates to a mobile station, a base station, a method of reporting an uplink data amount, and a method of allocating a resource to uplink data.

BACKGROUND ART

The standardization to enhance LTE-A (Long Term Evolution-Advanced) is currently under discussion in 3GPP (3rd Generation Partnership Project) as a next generation communication standard for LTE (Long Term Evolution). A carrier aggregation (CA) technology is introduced in an LTE-A system to maintain backward compatibility with an LTE system and to achieve higher throughput than the LTE system. According to the carrier aggregation, a component carrier (CC) having a maximum bandwidth of 20 MHz, which is supported by the LTE system, is used as a basic component. Then, a plurality of component carriers are simultaneously used, thereby achieving broader bandwidth communication.

According to the carrier aggregation, a mobile station (UE: User Equipment) can communicate with a base station (eNB: evolved Node B), simultaneously using a plurality of component carriers. In the carrier aggregation, a primary cell (PCell) and a secondary cell (SCell) are provided. The primary cell is reliable and used to maintain connectivity with a mobile station. The secondary cell is additionally configured for the mobile station which is accessing the primary cell.

The primary cell is similar to a serving cell in an LTE system, and serves as a cell to maintain connectivity between a mobile station and a network. On the other hand, the secondary cell is configured for the mobile station additionally to the primary cell. Addition and deletion of the secondary cell is ordered by a RRC (Radio Resource Control) configuration.

Figure 1A:
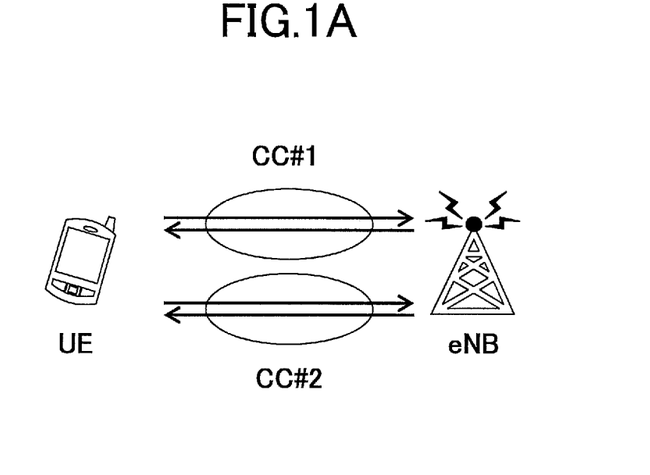
FIG. 1A shows a schematic diagram of carrier aggregation (carrier aggregation using CCs provided by a single base station) according to one or more embodiments of the present invention.
Figure 1B:
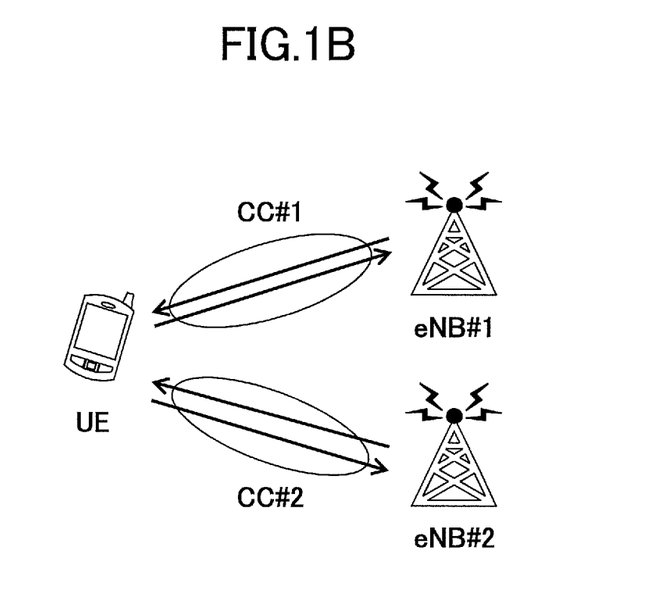
FIG. 1B shows a schematic diagram of carrier aggregation (carrier aggregation using CCs provided by a plurality of base stations) according to one or more embodiments of the present invention.

In the carrier aggregation up to LTE Release 10 (Rel-10), as shown in FIG. 1A, it is defined that a mobile station uses a plurality of component carriers provided by a single base station for simultaneous communication. Meanwhile, in Rel-12, the carrier aggregation defined in Rel-10 is further extended, and as shown in FIG. 1B, dual connectivity is under discussion, where a mobile station uses a plurality of component carriers provided by a plurality of base stations for simultaneous communication. For example, if all component carriers cannot be accommodated in a single base station, it is considered that the dual connectivity can be effectively utilized to achieve throughput nearly equal to that in Rel-10 (see Non-Patent Document 1).

Figure 2:
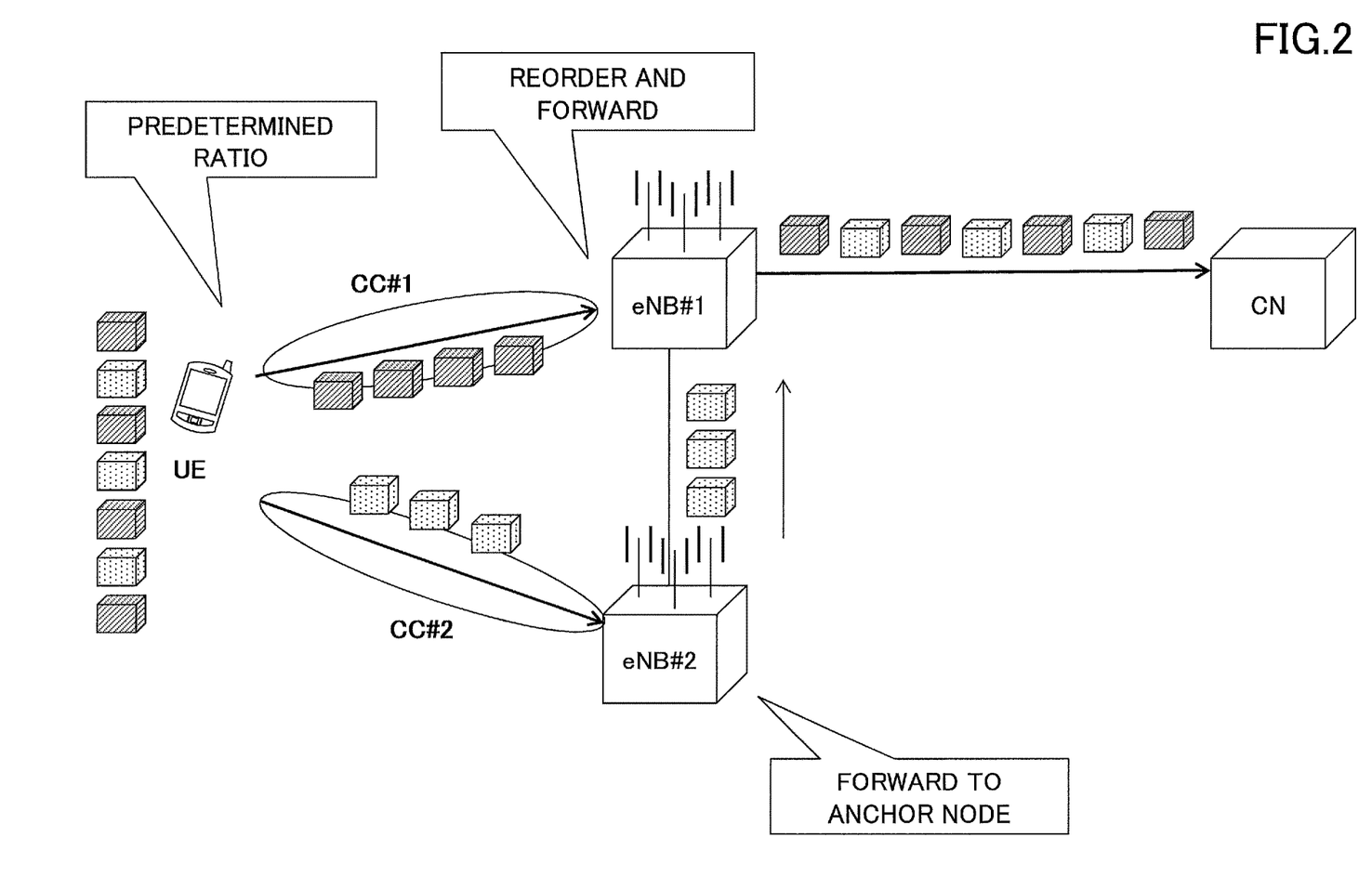
FIG. 2 shows a schematic diagram of bearer splitting in dual connectivity according to one or more embodiments of the present invention.

In the dual connectivity, as shown in FIG. 2, bearer splitting is under discussion, where a mobile station (UE) splits a single EPS (Evolved Packet System) bearer or packet sequence in a predefined manner and uses component carriers provided by a plurality of base stations (eNB #1, eNB #2) to simultaneously transmit the respective split packet sequences. Specifically, as shown, the mobile station splits the to-be-transmitted EPS bearer into packet sequences destined for eNB #1 and eNB #2 in a predetermined ratio (eNB #1:eNB #2=4:3 in the shown example) and transmits the respective split packet sequences to the base stations eNB #1 and eNB #2 via component carriers CC #1 and CC #2, respectively. Upon receiving the split packet sequence via CC #2, the base station eNB #2 serving as a non-anchor node forwards the received packet sequence to the anchor base station eNB #1. Upon receiving the packet sequence forwarded from eNB #2, eNB #1 reorders the packet sequence received via CC #1 and the packet sequence received from eNB #2 to reconstruct the packet sequences from the mobile station and forwards the reconstructed packet sequences to a core node (CN).

PRIOR ART DOCUMENT

Non-Patent Document

[Non-Patent Document 1] 3GPP TR36.842 V12.0.0 (2013 December), "Study on Small Cell enhancements for E-UTRA and E-UTRAN; Higher layer aspects"

SUMMARY OF INVENTION

For a packet distribution method to implement the bearer splitting of uplink data, a scheme of semi-statically setting a ratio for distributing a data amount of the uplink data over respective component carriers or cell groups (CGs) (eNB #1:eNB #2=4:3 in the example in FIG. 2) has been proposed.

However, in accordance with the scheme of semi-statically setting the ratio for distributing the data amount, if the ratio for distributing the data amount is not properly set, there is a likelihood that uplink throughput cannot be improved. For example, if throughput sufficient to transmit distributed data cannot be achieved in a certain cell due to degraded communication quality, the data distributed to the cell will remain in a transmission buffer for storing to-be-transmitted uplink data.

On the other hand, a scheme of reporting the same data amount of the uplink data to both base stations (eNB #1 and eNB #2 in the example in FIG. 2) has been also proposed (referred to as double buffer status reporting or double BSR).

However, in accordance with the scheme of reporting the same data amount of the uplink data to both base stations (eNB #1 and eNB #2 in the example in FIG. 2), there is a likelihood that radio resources are redundantly allocated in both the base stations, which may waste radio resources.

In view of these problems, it is a general object of the present invention to efficiently transmit uplink data in dual connectivity.

In one aspect of the present invention, there is provided a mobile station for performing communication using component carriers which belong to a plurality of base stations, including:

a reception unit configured to receive configuration information about a scheme of reporting a data amount of uplink data from a base station;

a buffer status management unit configured to manage the data amount of uplink data stored in a transmission buffer;

a transmission control unit configured to select a base station to which the data amount of uplink data is to be reported according to the configuration information about the scheme of reporting the data amount of uplink data; and a transmission unit configured to report the data amount of uplink data to the selected base station.

In another aspect of the present invention, there is provided a base station in a radio communication system in which a mobile station performs communication using component carriers which belong to a plurality of base stations, including:

a transmission unit configured to transmit configuration information about a scheme of reporting a data amount of uplink data; and a resource allocation unit configured to allocate a resource for transmitting the uplink data according to the configuration information about the scheme of reporting the data amount of uplink data.

In another aspect of the present invention, there is provided a method of reporting an uplink data amount in a mobile station for performing communication using component carriers which belong to a plurality of base stations, including the steps of:

receiving configuration information about a scheme of reporting a data amount of uplink data from a base station;

managing the data amount of uplink data stored in a transmission buffer;

selecting a base station to which the data amount of uplink data is to be reported according to the configuration information about the scheme of reporting the data amount of uplink data; and reporting the data amount of uplink data to the selected base station.

In another aspect of the present invention, there is provided a method of allocating a resource to uplink data in a base station in a radio communication system in which a mobile station performs communication using component carriers which belong to a plurality of base stations, including the steps of:

transmitting configuration information about a scheme of reporting a data amount of uplink data; and allocating a resource for transmitting uplink data according to the configuration information about the scheme of reporting the data amount of uplink data.

According to one or more embodiments of the present invention, it is possible to efficiently transmit uplink data in dual connectivity.

DETAILED DESCRIPTION OF EMBODIMENTS

Embodiments of the present invention are described below with reference to the drawings.

Embodiments of the present invention are described focusing on a communication system including a mobile station for performing communication using component carriers which belong to a plurality of base stations. A type of connectivity in carrier aggregation (CA) where a mobile station performs communication using component carriers (CCs) belonging to different base stations is referred to as "dual connectivity". In the dual connectivity, a base station corresponding to a primary cell (PCell) is referred to as a "master base station (MeNB: Master eNB)" and a base station corresponding to a secondary cell (SCell) is referred to as a "secondary base station (SeNB: Secondary eNB)".

In the dual connectivity, in order for a mobile station to transmit uplink data, the mobile station needs to transmit a buffer status report (BSR) indicating a data amount of the uplink data to a base station.

Figure 3A:
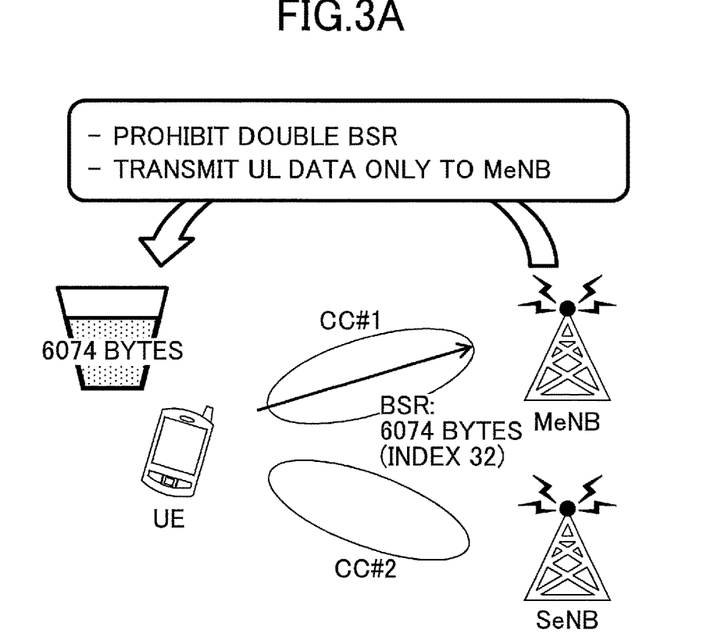
FIG. 3A shows a schematic diagram of BSR transmission in a communication system according to one or more embodiments of the present invention (a scheme of transmitting a BSR to a specified base station)
Figure 3B:
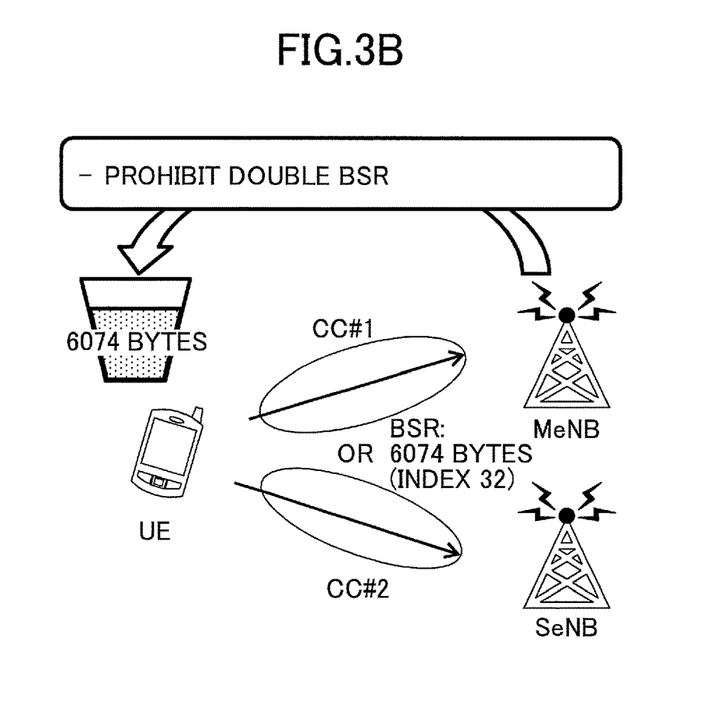
FIG. 3B shows a schematic diagram of BSR transmission in a communication system according to one or more embodiments of the present invention (a scheme of transmitting a BSR to any of base stations)
Figure 3C:
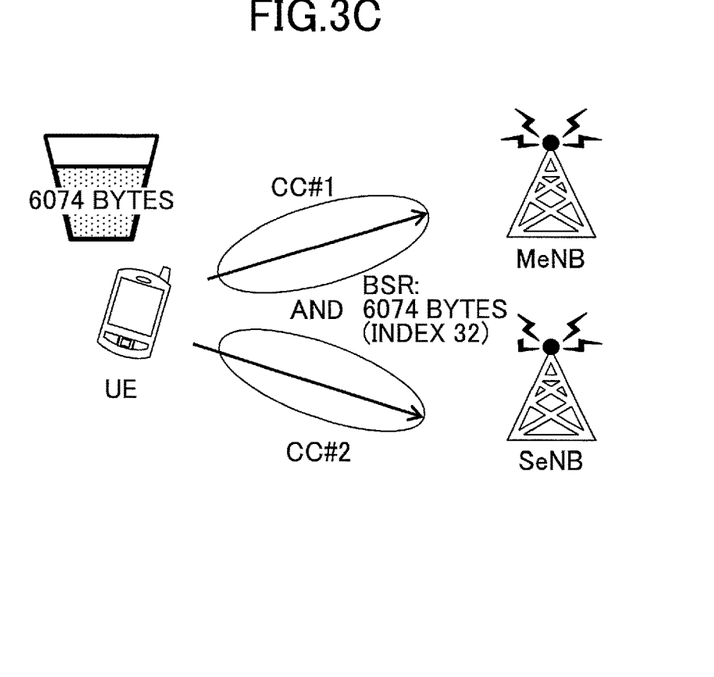
FIG. 3C shows a schematic diagram of BSR transmission in a communication system according to one or more embodiments of the present invention (a scheme of transmitting a BSR to both base stations)

As shown in FIGS. 3A-3C, the following three schemes are possible to transmit a BSR.

(A) scheme of transmitting a BSR to a specified base station (FIG. 3A)

The base station proactively prohibits the mobile station from reporting the same data amount of uplink data to both base stations (double BSR) via RRC signaling. In addition, the base station specifies a base station to which the mobile station should transmit uplink data. Then, the mobile station transmits a BSR to the specified base station.

(B) scheme of transmitting a BSR to any of base stations (FIG. 3B)

The base station proactively prohibits the mobile station from reporting the same data amount of uplink data to both base stations via RRC signaling. The base station does not specify a base station to which the mobile station should transmit uplink data. Then, the mobile station transmits a BSR to any of the base stations.

(C) scheme of transmitting a BSR to both base stations (FIG. 3C)

The base station proactively allows the mobile station to report the same data amount of uplink data to both base stations. Then, the mobile station transmits a BSR to both the base stations.

Configuration of a Radio Communication System

As shown in FIGS. 3A-3C, a radio communication system includes a mobile station (UE) and a plurality of base stations (MeNB and SeNB). The radio communication system supports dual connectivity where the mobile station uses component carriers CC #1, CC #2 provided by the plurality of base stations for simultaneous communication, and as shown, the mobile station uses a dual connectivity function to communicate with the master base station (MeNB) and the secondary base station (SeNB).

The mobile station has the dual connectivity function to simultaneously communicate with the plurality of base stations. Typically, the mobile station may be any appropriate information processing device with a radio communication function such as a smartphone, a mobile phone, a tablet, and a mobile router. The mobile station includes a CPU (Central Processing Unit) such as a processor, a memory device such as a RAM (Random Access Memory) and a flash memory, a radio communication device for transmitting and receiving radio signals to/from the base stations, and so on. For example, functions and operations of the mobile station as stated below may be implemented by the CPU processing or running data and program stored in the memory device. However, the mobile station is not limited to the above-mentioned hardware configuration and may include a circuit for implementing one or more of operations as described below.

The base stations establish a radio connection to the mobile station to transmit downlink (DL) packets received from network devices, such as an upper station and a server communicatively connected on a core network (not shown), to the mobile station as well as transmit uplink (UL) packets received from the mobile station to the network devices. In the shown embodiment, one of the base stations serves as a master base station (MeNB) or a primary base station, and the other base station serves as a secondary base station (SeNB). In dual connectivity, the master base station controls simultaneous communication between the mobile station and both the base stations in accordance with the dual connectivity and controls communication to the upper core network (not shown). In one or more embodiments of the present invention, the master base station transmits configuration information indicating any one of the schemes of transmitting a BSR as shown in FIGS. 3A-3C to the mobile station.

Configuration of a Base Station

Figure 4:
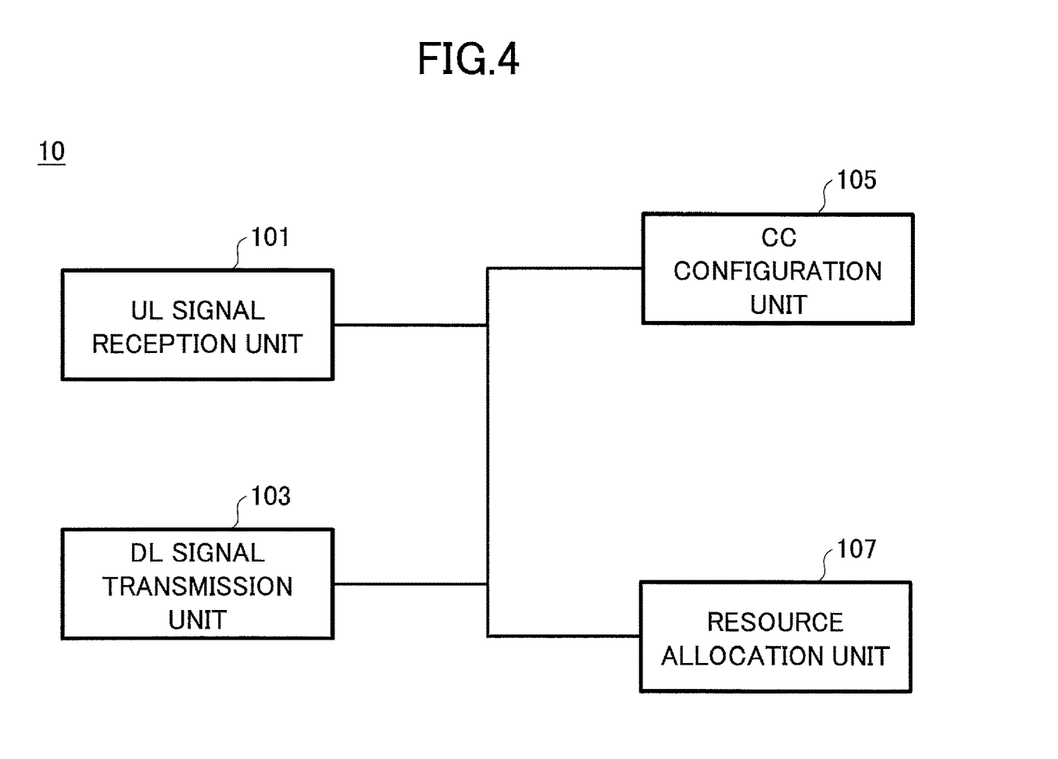
FIG. 4 shows a block diagram of a base station according to one or more embodiments of the present invention.

FIG. 4 shows a block diagram of a base station 10 according to one or more embodiments of the present invention. The base station 10 is a master base station which configures component carriers for a mobile station to perform simultaneous communication according to dual connectivity. The base station 10 includes an uplink (UL) signal reception unit 101, a downlink (DL) signal transmission unit 103, a component carrier (CC) configuration unit 105, and a resource allocation unit 107.

The UL signal reception unit 101 receives uplink signals from a mobile station. For configuration of a component carrier, the UL signal reception unit 101 receives a measurement result (measurement report) of radio quality from the mobile station. For resource allocation of uplink data, the UL signal reception unit 101 receives a BSR indicating a data amount of the uplink data from the mobile station.

The DL signal transmission unit 103 transmits downlink signals to the mobile station. For configuration of a component carrier, the DL signal transmission unit 103 transmits RRC signaling (RRC Connection Reconfiguration) including configuration information of the component carrier to the mobile station. The configuration information of the component carrier transmitted via the RRC signaling includes configuration information about a scheme of transmitting a BSR. Specifically, the configuration information of the component carrier includes any one of the three schemes as shown in FIGS. 3A-3C, that is, (A) the scheme of transmitting a BSR to a specified base station among the master base station and the secondary base station (FIG. 3A), (B) the scheme of transmitting a BSR to any of the master base station and the secondary base station (FIG. 3B), and (C) the scheme of transmitting a BSR to both the master base station and the secondary base station (FIG. 3C). For resource allocation of uplink data, the DL signal transmission unit 103 transmits resource allocation information (UL grant) indicating a resource of the uplink data.

The CC configuration unit 105 manages a component carrier configured between a base station and the mobile station. When the mobile station initially accesses the base station, the CC configuration unit 105 configures a component carrier of a primary cell in response to a connection request (RRC Connection Request) from the mobile station. The CC configuration unit 105 also configures a component carrier of a secondary cell based on a measurement result (measurement report) of radio quality reported from the mobile station. As described above, the configuration information of the component carrier is transmitted via the RRC signaling from the DL signal transmission unit 103 to the mobile station.

The resource allocation unit 107 allocates an uplink resource based on the BSR received from the mobile station. However, when the base station 10 specifies that a BSR is to be transmitted to another base station (secondary base station) according to the scheme as shown in FIG. 3A or 3B, the resource allocation unit 107 need not allocate an uplink resource to the mobile station. When the base station 10 specifies that a BSR is to be transmitted to both the master base station and the secondary base station, the resource allocation unit 107 may avoid allocating a redundant resource to the mobile station by cooperating with another base station (secondary base station).

Configuration of a Mobile Station

Figure 5:
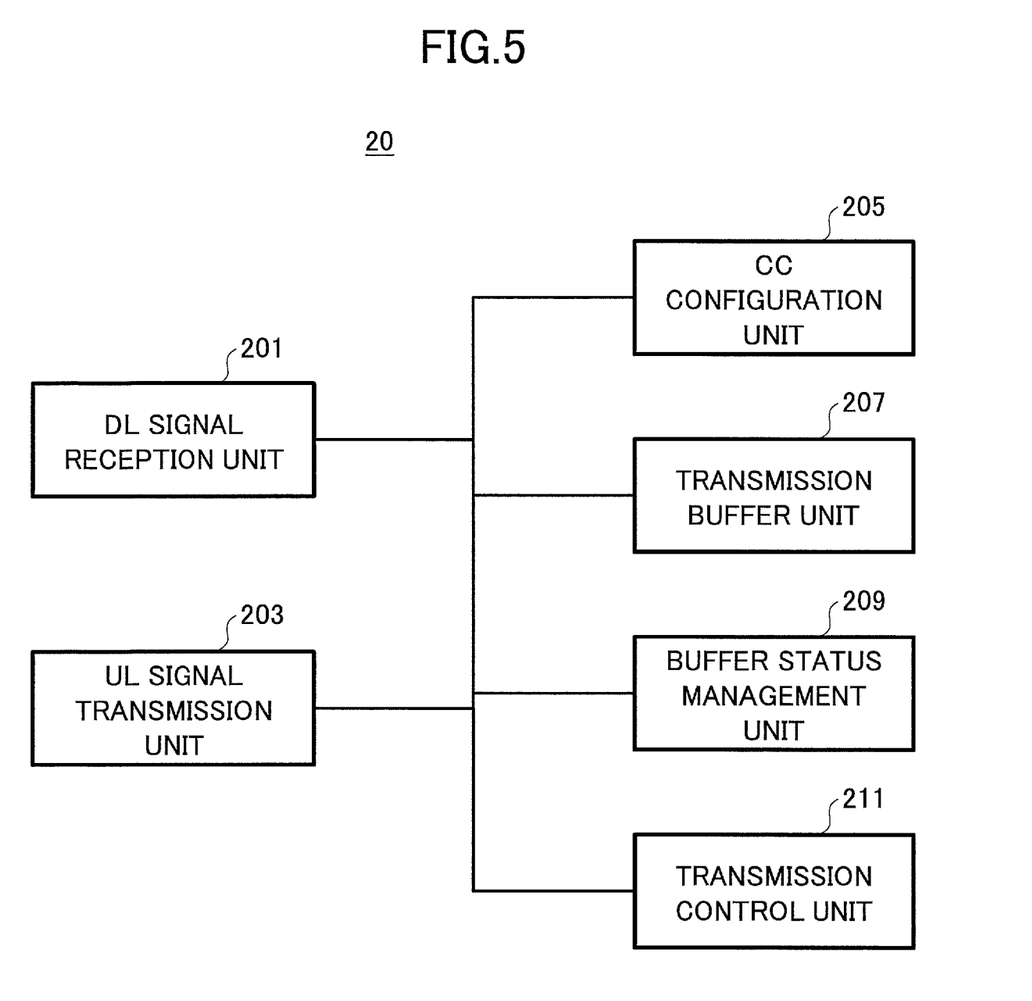
FIG. 5 shows a block diagram of a mobile station according to one or more embodiments of the present invention.

FIG. 5 shows a block diagram of a mobile station according to one or more embodiments of the present invention. The mobile station 20 includes a DL signal reception unit 201, a UL signal transmission unit 203, a CC configuration unit 205, a transmission buffer unit 207, a buffer status management unit 209, and a transmission control unit 211.

The DL signal reception unit 201 receives downlink signals from a base station. For configuration of a component carrier, the DL signal reception unit 201 receives RRC signaling (RRC Connection Reconfiguration) including configuration information of the component carrier from the base station. As described above, the configuration information of the component carrier transmitted via the RRC signaling includes configuration information about a scheme of transmitting a BSR. For resource allocation of uplink data, the DL signal reception unit 201 receives resource allocation information (UL grant) indicating a resource of the uplink data.

The UL signal transmission unit 203 transmits uplink signals to the base station. For configuration of a component carrier, the UL signal transmission unit 203 transmits a measurement result (measurement report) of radio quality to the base station. For resource allocation of uplink data, the UL signal transmission unit 203 transmits a BSR indicating a data amount of the uplink data to the base station.

The CC configuration unit 205 configures a component carrier between a base station and the mobile station according to the configuration information of the component carrier received from the base station. When the mobile station 20 initially accesses the base station, the CC configuration unit 205 configures a component carrier of a primary cell according to the configuration information (RRC Connection Reconfiguration) of the component carrier. Then, upon addition of a secondary cell, the CC configuration unit 205 configures a component carrier of the secondary cell according to the configuration information (RRC Connection Reconfiguration) of the component carrier of the secondary cell.

The transmission buffer unit 207 is a storage device for storing to-be-transmitted uplink data.

The buffer status management unit 209 manages a data amount of uplink data stored in the transmission buffer unit 207. For example, the buffer status management unit 209 determines the number of bytes of data stored in the transmission buffer unit 207 and transmits the determined number of bytes to the transmission control unit 211. The buffer status management unit 209 may also monitor the amount of data stored in the transmission buffer unit 207 and transmit the monitored amount of data to the transmission control unit 211 periodically or in response to an occurrence of a predetermined notification event. The buffer status management unit 209 may also detect the amount of data stored in the transmission buffer unit 207 in response to an order from the transmission control unit 211 and transmit the detected amount of data to the transmission control unit 211.

The transmission control unit 211 selects a base station to which a BSR is to be transmitted.

When the scheme of transmitting a BSR to a specified base station among the master base station and the secondary base station (FIG. 3A) is received from the base station, the transmission control unit 211 selects the specified base station as the base station to which a BSR is to be transmitted. In this case, the BSR to be transmitted to the specified base station indicates a data amount of uplink data managed by the buffer status management unit 209.

When the scheme of transmitting a BSR to any of the master base station and the secondary base station (FIG. 3B) is received from the base station, the transmission control unit 211 selects any of the master base station and the secondary base station as the base station to which a BSR is to be transmitted. In this case, the master base station may be selected, the secondary base station may be selected, or the master base station and the secondary base station may be selected alternately or in a predetermined ratio for each BSR transmission. When the master base station and the secondary base station are selected in a predetermined ratio, the data amount of uplink data may be distributed in the predetermined ratio upon transmitting a BSR. For example, when the master base station and the secondary base station are selected in a ratio of 4:3, 4/7 of the data amount of uplink data managed by the buffer status management unit 209 may be reported to the master base station and 3/7 of the data amount may be reported to the secondary base station.

When the scheme of transmitting a BSR to both the master base station and the secondary base station (FIG. 3C) is received from the base station, the transmission control unit 211 selects both the master base station and the secondary base station as the base station to which a BSR is to be transmitted. In this case, the BSR to be transmitted to both the master base station and the secondary base station indicates the same data amount of uplink data managed by the buffer status management unit 209.

Operations of a Base Station and a Mobile Station

Figure 6:
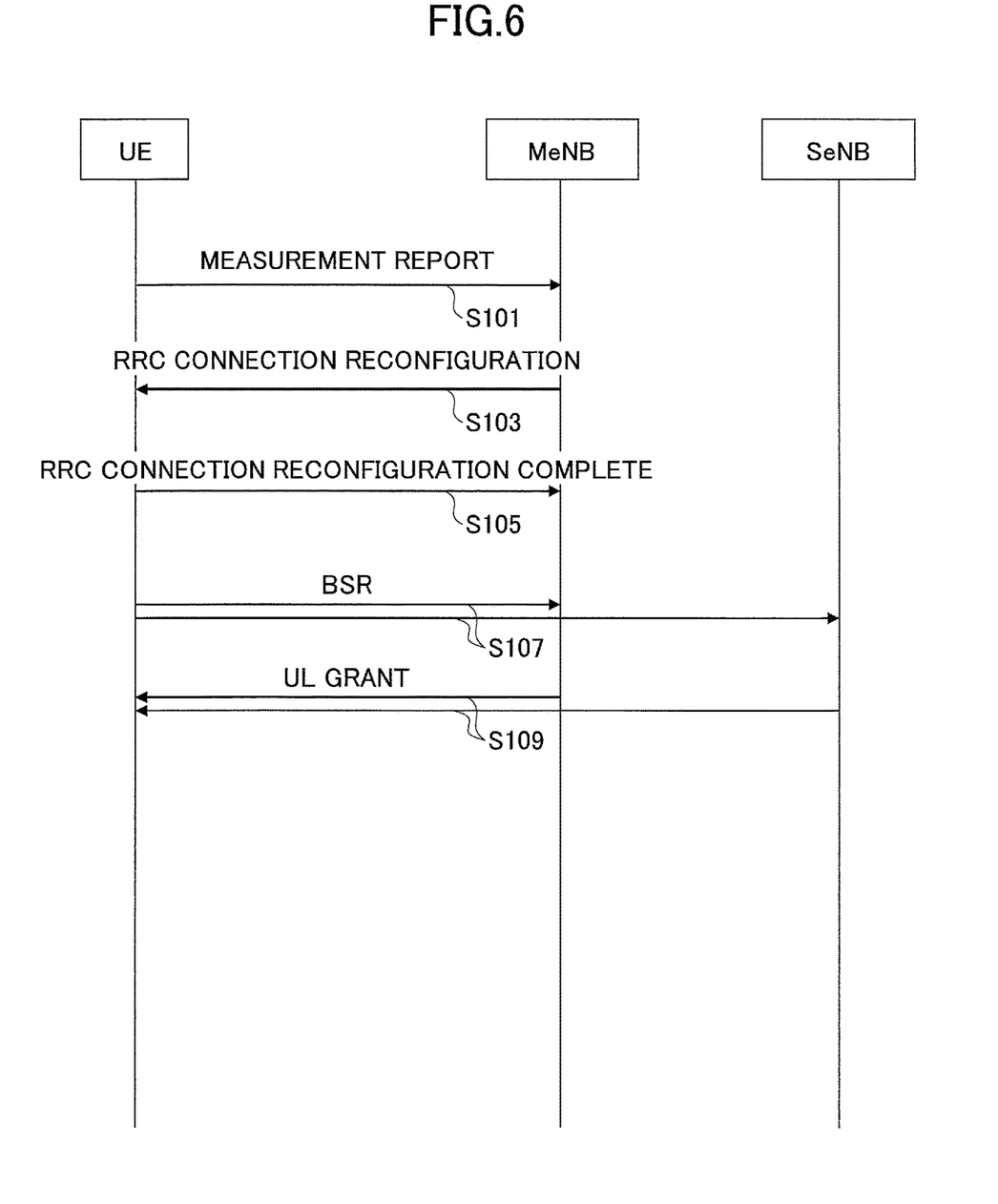
FIG. 6 shows a sequence diagram of a method of allocating a resource to uplink data according to one or more embodiments of the present invention.

FIG. 6 shows a method of allocating a resource of uplink data according to one or more embodiments of the present invention.

The UL signal transmission unit 203 in the mobile station (UE) periodically transmits a measurement result (measurement report) of radio quality to the master base station (MeNB) (step S101). The CC configuration unit 105 in the master base station configures a component carrier of a primary cell or a secondary cell based on the measurement result (measurement report) of radio quality and transmits RRC signaling (RRC Connection Reconfiguration) including configuration information of the component carrier via the DL signal transmission unit 103 (step S103). The RRC Connection Reconfiguration includes configuration information about a scheme of transmitting a BSR. The CC configuration unit 205 in the mobile station configures a component carrier according to the configuration information of the component carrier, and upon completion of the configuration of the component carrier, transmits a completion report (RRC Connection Reconfiguration Complete) to the base station via the UL signal transmission unit 203 (step S105).

When uplink data are generated in the mobile station, the buffer status management unit 209 in the mobile station reports the amount of data stored in the transmission buffer unit 207 to the transmission control unit 211. The transmission control unit 211 in the mobile station selects a base station to which the data amount of uplink data is to be reported according to the configuration information about the scheme of transmitting a BSR included in the RRC Connection Reconfiguration, and the UL signal transmission unit 203 transmits a BSR indicating the data amount of uplink data to the base station (step S107). While the example in FIG. 6 shows that a BSR is transmitted to both the base stations, the BSR is transmitted to a specified base station, any of the base stations, or both the base stations according to the configuration information about the scheme of transmitting a BSR.

The resource allocation unit 107 in the base station allocates an uplink resource based on the BSR received from the mobile station and transmits resource allocation information (UL grant) to the mobile station via the DL signal transmission unit 103 (step S109). While the example shown in FIG. 6 shows that a UL grant is transmitted from both the base stations, the UL grant is transmitted from a base station (the specified base station, any of the base stations, or both the base stations) which receives the BSR.

Next, the operations in the mobile station are described in detail below.

Figure 7:
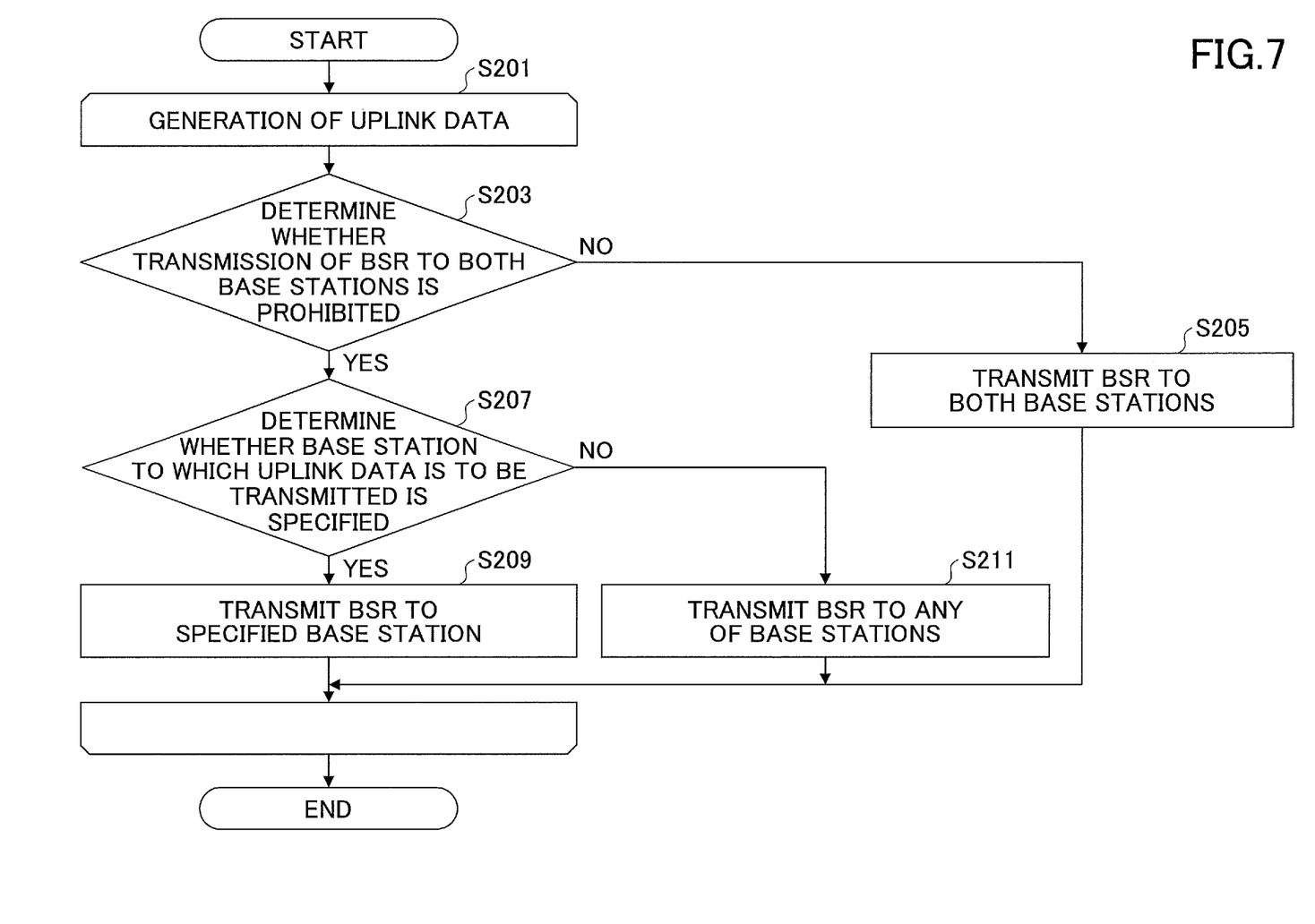
FIG. 7 shows a flowchart of operations in a mobile station according to one or more embodiments of the present invention.

FIG. 7 shows a flowchart of operations in a mobile station according to one or more embodiments of the present invention.

Periodically or in response to an occurrence of a predetermined notification event, the buffer status management unit 209 determines whether uplink data are generated (step S201). When uplink data are generated, the following procedures are executed.

The transmission control unit 211 checks whether transmission of a BSR indicating the same data amount to both the base stations (double BSR) is prohibited via an RRC configuration from the base station (step S203). When transmission of a BSR to both the base stations is not prohibited (step S203: NO), the transmission control unit 211 transmits a BSR indicating the same data amount to both the base stations via the UL signal transmission unit 203 (step S205).

When transmission of a BSR to both the base stations is prohibited (step S203: YES), the transmission control unit 211 checks whether a base station to which uplink data is to be transmitted is specified, in other words, a base station to which a BSR is to be transmitted is specified (step S207). When a base station to which a BSR is to be transmitted is specified (step S207: YES), the transmission control unit 211 transmits a BSR to the specified base station via the UL signal transmission unit 203 (step S209). When a base station to which a BSR is to be transmitted is not specified (step S207: NO), the transmission control unit 211 transmits a BSR to any of the base stations via the UL signal transmission unit 203 (step S211).

Effects of Embodiments of the Invention

According to one or more embodiments of the present invention, it is possible to efficiently transmit uplink data in dual connectivity. More specifically, compared to the scheme of semi-statically setting the ratio for distributing the data amount, throughput of uplink data per user can be improved.

In addition, the scheme of transmitting a BSR indicating the same data amount to both the base stations can be allowed only when the master base station and the secondary base station can cooperatively allocate radio resources, thereby preventing waste of radio resources.

For convenience of explanation, the base station and the mobile station according to the embodiments of the present invention have been described with reference to functional block diagrams, but the base station and the mobile station may be implemented in hardware, software, or combinations thereof. In addition, two or more functional elements may be combined as appropriate. The method according to the embodiments of the present invention may be carried out in a different order from the order shown in the embodiments.

While the approaches are described above to efficiently transmit uplink data in dual connectivity, the present invention is not limited to the embodiments, but various modifications and applications can be made by those skilled in the art within the scope of the claims.

The present international application is based on and claims the benefit of priority of Japanese Patent Application No. 2014-096084 filed on May 7, 2014, the entire contents of which are hereby incorporated by reference.

DESCRIPTION OF NOTATIONS 10 base station
101 UL signal reception unit
103 DL signal transmission unit
105 CC configuration unit
107 resource allocation unit
20 mobile station
201 DL signal reception unit
203 UL signal transmission unit
205 CC configuration unit
207 transmission buffer unit
211 transmission control unit

The invention claimed is:

1. A mobile station for performing communication using component carriers which belong to a plurality of base stations including a master base station and a secondary base station, comprising:
a transmitter that periodically transmits a measurement report of radio quality to at least one base station out of the plurality of base stations;
a receiver that receives, from at least one base station out of the plurality of base stations, configuration information about a scheme of reporting a data amount of uplink data, the configuration information being received via Radio Resource Control (RRC) signaling from the master base station;
a processor that:
manages a data transmission buffer that stores the data amount of uplink data,
identifies an amount of data stored in the data transmission buffer, and
determines whether report of the data amount of uplink data to both the master base station and the secondary base station is banned by the configuration information,
wherein:
if the report of the data amount of uplink data to both the master base station and the secondary base station is banned, the processor selects a base station specified by the configuration information as a destination of the data amount of uplink data,
the data amount of uplink data reported is indicative of the amount of data stored in the data transmission buffer and transmission of the uplink data is based on the measurement report of radio quality,
the master base station and the secondary base station belong to two different cell groups,
the configuration information explicitly forbids the mobile station from reporting the data amount of uplink data to both base stations, and
the transmitter reports the data amount of uplink data to the specified base station.

2. A method of reporting an uplink data amount in a mobile station for performing communication using component carriers which belong to a plurality of base stations including a master base station and a secondary base station, comprising:
periodically transmitting a measurement report of radio quality to at least one base station out of the plurality of base stations;
receiving, from at least one base station out of the plurality of base stations, configuration information about a scheme of reporting a data amount of uplink data, the configuration information being received via Radio Resource Control (RRC) signaling from the master base station;
managing a data transmission buffer that stores the data amount of uplink data;
identifying an amount of data stored in the data transmission buffer;
determining whether report of the data amount of uplink data to both the master base station and the secondary base station is banned by the configuration information,
wherein:
if the report of the data amount of uplink data to both the master base station and the secondary base station is banned, a base station specified by the configuration information is selected as a destination of the data amount of uplink data,
the data amount of uplink data reported being indicative of the amount of data stored in the data transmission buffer and transmission of the uplink data being based on the measurement report of radio quality,
the configuration information explicitly forbids the mobile station from reporting the data amount of uplink data to both base stations, and
the master base station and the secondary base station belong to two different cell groups, and
reporting the data amount of uplink data to the specified base station.

3. The mobile station as claimed in claim 1, wherein if the report of the data amount of uplink data to both the master base station and the secondary base station is not banned, the processor selects the master base station and the secondary base station as the destination of the data amount of uplink data.

* * * * *